United States Patent
Vasquez, Jr.

(10) Patent No.: US 6,227,085 B1
(45) Date of Patent: May 8, 2001

(54) VIBRATION ATTENUATOR

(76) Inventor: Andrew R. Vasquez, Jr., P.O. Box 3268, Rancho Cordova, CA (US) 95741

( * ) Notice: Subject to any disclaimer, the term of this patent is extended or adjusted under 35 U.S.C. 154(b) by 0 days.

(21) Appl. No.: 09/378,133

(22) Filed: Aug. 19, 1999

(51) Int. Cl.$^7$ .................................................. B23B 5/02
(52) U.S. Cl. ................................ 82/163; 82/112; 74/574
(58) Field of Search ........................... 82/163, 112, 162; 408/17, 143; 409/141; 74/574

(56) References Cited

U.S. PATENT DOCUMENTS

| | | |
|---|---|---|
| 3,691,878 | 9/1972 | Mitchell . |
| 3,710,661 | 1/1973 | Mitchell . |
| 4,178,819 | 12/1979 | Mahon . |
| 4,266,454 | 5/1981 | Mitchell et al. . |
| 4,478,116 * | 10/1984 | Fuller ........................................ 82/112 |
| 4,510,828 * | 4/1985 | Bogaerts et al. ......................... 82/112 |
| 4,523,499 * | 6/1985 | Aldridge, Jr. ............................ 82/112 |
| 4,531,434 | 7/1985 | Vasquez . |
| 5,224,303 | 7/1993 | Baldwin . |
| 5,297,460 | 3/1994 | Hartmen et al. . |
| 5,765,457 * | 6/1998 | Meyer et al. ............................ 82/112 |

* cited by examiner

Primary Examiner—Henry Tsai
(74) Attorney, Agent, or Firm—Fulwider Patton Lee & Utecht, LLP

(57) ABSTRACT

A gyration/reciprocating action switching mechanism. The mechanism includes an output shaft, a first clutch mounted on said output shaft, and a second clutch mounted inside the first clutch and coupled to the output shaft. A torsional force adjustment mechanism is mounted on a speed reduction mechanism of a power hand tool. The mechanism further includes a gyration adjustment device. The rotation of the gyration adjustment device to a lower limit position forces the first axle sleeve of the first clutch into engagement with the second axle sleeve of the first clutch to shorten the stroke of the output shaft, causing the first cam to be disengaged from the second cam by the spring force of a coil spring of the second clutch, enabling the coil spring of the second clutch to be compressed to force the first cam into contact with the second cam and to let the output shaft be reciprocated upon pressing of the output shaft against an object.

5 Claims, 2 Drawing Sheets

VIBRATION ATTENUATOR

BACKGROUND OF THE INVENTION

1. Field of the Invention

The present invention relates to a power hand tool, and more specifically to a gyration/reciprocating action switching mechanism for a power hand tool, which shortens the spread of axles of the output shaft of the power hand tool, enabling the axial length of the power hand tool to be minimized for convenient holding of the hand.

2. Description of the Related Art

U.S. Pat. No. 5,711,380 discloses a rotate percussion hammer/drill shift device suitable for hand drill. The device is disposed at an output spindle of a drill to provide the drill with a percussion function. It comprises a stationary percussion cam, an output shaft that is connected to the output spindle of the drill in a coaxial manner wherein the output shaft can be selectively moved to a working position from a normal position. This output shaft further includes a rotary cam by which the output shaft may rotate synchronously with the spindle of the drill, and a clutch mechanism which retains the output shaft in the normal position and permits the output shaft to be moved to the working position. The percussion cam is in contact with the rotary cam, which is rotating such that the rotary cam generates a periodical hammer movement in the axial direction. Consequently, the output shaft is provided with a hammer movement. This design is functional. However, because this design is comprised of a great number of parts, its manufacturing cost is high, and its assembly procedure is complicated. Because of huge dimension and heavy weight, the user cannot hold the power hand tool for a long time.

SUMMARY OF THE INVENTION

It is one object of the present invention to provide a gyration/reciprocating action switching mechanism for a power hand tool, which shortens the spread of axles of the output shaft of the power hand tool, enabling the axial length of the power hand tool to be minimized for convenient holding of the hand. It is another object of the present invention to provide a gyration/reciprocating action switching mechanism for a power hand tool, which is inexpensive to manufacture, and easy to install. To achieve these and other objects of the present invention, there is provided a gyration/reciprocating action switching mechanism, which comprises an output shaft, a first clutch mounted on said output shaft, a second clutch mounted inside said first clutch and coupled to said output shaft, a torsional force adjustment mechanism mounted on a speed reduction mechanism of a power hand tool, and a gyration control device, wherein rotating the gyration adjustment device to a lower limit position forces the first axle sleeve of the first clutch into engagement with the second axle sleeve of the first clutch to shorten the stroke of the output shaft, thereby causing the first cam to be retained disengaged from the second cam by means of the effect of the spring force of a coil spring of the second clutch, for enabling the coil spring of the second clutch to be compressed to force the first cam into contact with the second cam and to let the output shaft be reciprocated upon pressing of the output shaft against an object.

DETAILED DESCRIPTION OF THE PREFERRED EMBODIMENT

Figure 1:
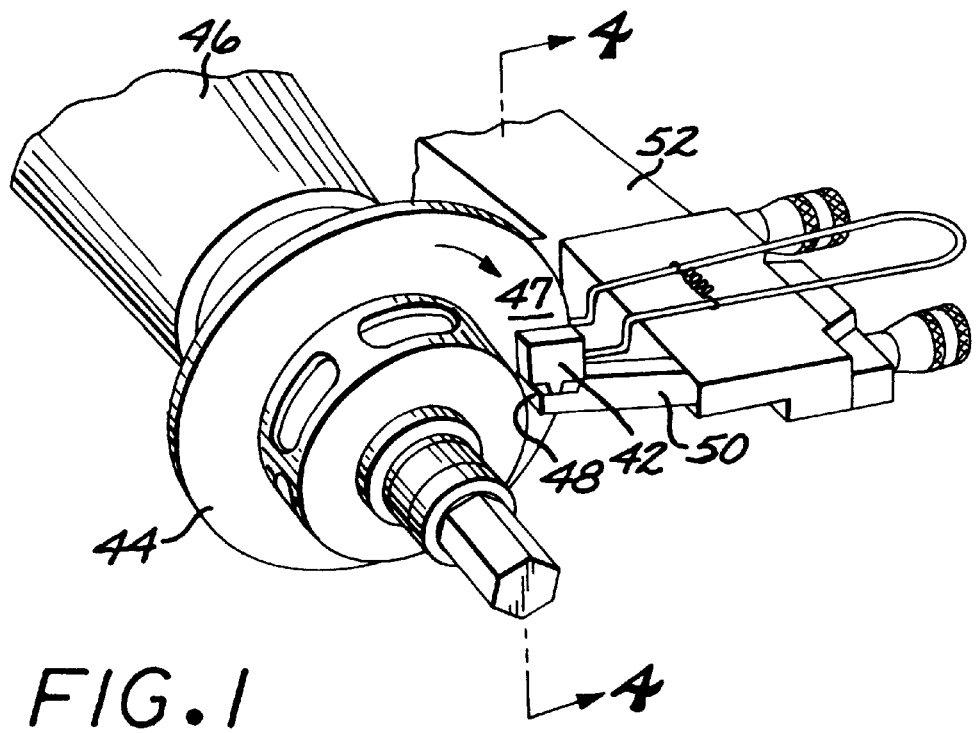
FIG. 1 is an exploded view of the present invention.
Figure 2:
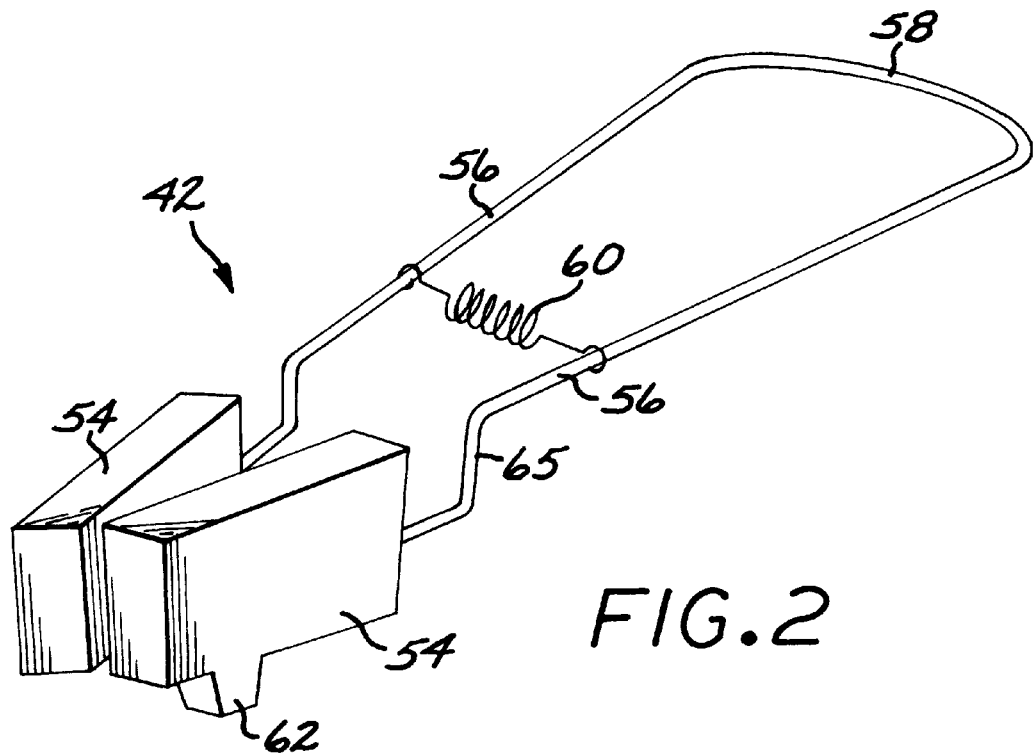
FIG. 2 is a sectional assembly view of the present invention.

Referring to FIGS. 1 and 2, a gyration/reciprocating action switching mechanism for a power hand tool in accordance with the present invention is generally comprised of an output shaft 1, a first clutch 2 mounted on the output shaft 1, a second clutch 3 mounted inside the first clutch 2 and coupled to the output shaft 1, a torsional force adjustment mechanism 5 mounted on the speed reduction mechanism 4 of a power hand tool, and a gyration control device 6.

The first clutch 2 is comprised of a first axle sleeve 21, a second axle sleeve 22, a first cam 23, a second cam 24 mounted in the second axle sleeve 22, and a retainer 25. The second axle sleeve 22 is mounted in a front tube 41 of the speed reduction mechanism 4, having a plurality of equiangularly spaced front notches 221. The first axle sleeve 21 is sleeved onto the output shaft 1, comprising a plurality of recessed portions 211 equiangularly spaced around the periphery at the front end thereof and extended in axial direction, a rear extension 212 axially extended from the rear end thereof, and a plurality of retaining portions 213 respectively engaged into the front notches 221 at the second axle sleeve 22. The first cam 23 is mounted on the output shaft 1, and stopped at the rear extension 212 of the first axle sleeve 21. The retainer 25 is fastened to an annular groove 11 around the periphery of the output shaft 1 to secure the first cam 23 in place. When the rear end of the output shaft 1 is inserted into the second axle sleeve 22, the serrated portion 231 of the first cam 23 is meshed with the serrated portion 241 of the second cam 24, thereby causing the output shaft 1 to do a hammering action.

The second clutch 3 is comprised of an axle bearing 31, an axle sleeve 32, a coil spring 33, and a gasket 34. The axle bearing 31 is comprised of two races 312 and 312' mounted around the output shaft 1, and rolling elements 311 mounted around the output shaft 1 between the races 312 and 312'. Before mounting the first axle sleeve 21 onto the output shaft 1, the axle bearing 31 is mounted in the first axle sleeve 21 of the first clutch 2. After installation of the axle bearing 31 in the first axle sleeve 21 of the first clutch 2, the gasket 34, the coil spring 33 and the axle sleeve 32 are respectively sleeved onto the output shaft 1, and then the first clutch 2 is mounted on the output shaft 1 and supported on the axle bearing 31. After installation of the second clutch 3, the coil spring 33 is received inside the axle sleeve 32, and stopped between the gasket 34 (which is stopped at a collar at the output shaft 1) and one end of the axle sleeve 32.

The torsional force adjustment mechanism 5 is mounted on the front tube 41 of the speed reduction mechanism 4, comprised of a driving member 51, a driven member 52, and a spring member 53. The driving member 51 and the driven member 52 have a respective toothed surface portion meshed with each other. Rotating the driving member 51 causes the driven member 52 to compress the spring member 53 against the speed reduction mechanism 4.

The gyration control device 6 is coupled to the torsional force adjustment mechanism 5, comprising a center through hole 61, which receives the output shaft 1, and a plurality of coupling rods 62 respectively engaged into the recessed portions 211 on the first axle sleeve 21 of the first clutch 2. Rotating the gyration adjustment device 6 controls the connection between the first axle sleeve 21 and the second axle sleeve 22.

Referring to Figures from 2 through 4, when rotating the driving member 51, the driven member 52 is driven to compress the spring member 53 against the speed reduction mechanism 4, at this time the torsional force of the spring member 53 is smaller than the torsional force of the internal serrated ring (not shown) of the speed reduction mechanism 4, the speed reduction mechanism 4 is rotated, therefore the output torsional force of the speed reduction mechanism 4 is changed (the first axle sleeve 21 is rotated with the speed reduction mechanism at this time, however the retaining portions 213 of the first axle sleeve 21 are disengaged from the notches 221 on the second axle sleeve 22, therefore the first cam 23 is not engaged with the second cam 24). When the torsional force of the spring member 53 surpasses the torsional force of the internal serrated ring of the speed reduction mechanism 4, the speed reduction mechanism 4 is stopped (at this time the torsional force adjustment mechanism 5 is shifted to the last position), and the gyration control device 6 carries the first axle sleeve 21, causing the retaining portions 213 of the first axle sleeve 21 to be forced into engagement with the recessed portions 221 of the second axle sleeve 22 to shorten the stroke of the output shaft 1. At this time, the serrated portion 231 of the first cam 23 is not meshed with the serrated portion 241 of the second cam 24. When the output shaft 1 is stopped against the work piece and pushed backwards, the coil spring 33 is compressed, thereby causing the serrated portion 231 of the first cam 23 to be moved into contact with the serrated portion 241 of the second cam 24, and therefore the output shaft 1 is reciprocated.

When the torsional force adjustment mechanism 5 is turned backwards to move the gyration control device 6, the first axle sleeve 21 is forced to disengage retaining portions 213 from the front notches 221 on the second axle sleeve 22, at this stage the stroke of the output shaft 1 is relatively increased, and the serrated portion 231 of the first cam 23 are prohibited from contacting the serrated portion 241 of the second cam 24, therefore the output shaft 1 is returned to the drilling action.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What the invention claimed is:

1. A gyration/reciprocating action switching mechanism comprising an output shaft, a first clutch mounted on said output shaft, a second clutch mounted inside said first clutch and coupled to said output shaft, a torsional force adjustment mechanism mounted on a speed reduction mechanism of a power hand tool, and a gyration control device, wherein:

said first clutch is comprised of a first axle sleeve sleeved onto said output shaft, a second axle sleeve embedded inside a front tube of the speed reduction mechanism of the power hand tool, a first cam fixedly mounted on said output shaft, a second cam mounted in said second axle sleeve, and a retainer, said second axle sleeve comprising a plurality of equiangularly spaced front notches, said first axle sleeve comprising a plurality of recessed portions equiangularly spaced around the periphery at a front end thereof and extended in axial direction, a rear extension axially extended from a rear end thereof, and a plurality of retaining portions respectively engaged into the front notches at said second axle sleeve, said first cam being stopped at the rear extension of said first axle sleeve and aimed at said second cam;

said second clutch is arranged between the first axle sleeve of said first clutch and said output shaft, the second clutch comprising an axle bearing, an axle sleeve, a coil spring, and a gasket;

said gyration control device is coupled to said torsional force adjustment mechanism, the gyration control device comprising a center through hole, which receives said output shaft, and a plurality of coupling rods respectively engaged into the recessed portions on the first axle sleeve of said first clutch; and rotation of said gyration control device to a lower limit position forces the retaining portions of the first axle sleeve of said first clutch into engagement with the front notches on the second axle sleeve of said first clutch to shorten a stroke of said output shaft, thereby causing said first cam to be retainably disengaged from said second cam by a spring force of the coil spring of said second clutch, thereby enabling the coil spring of said second clutch to be compressed to force said first cam into contact with said second cam and to let said output shaft be reciprocated upon pressing of said output shaft against an object.

2. The gyration/reciprocating action switching mechanism of claim 1 wherein said output shaft comprises an annular groove around the periphery thereof, and a retainer fastened to said annular groove to secure said first cam to said output shaft.

3. The gyration/reciprocating action switching mechanism of claim 1 wherein said first cam comprises a serrated portion at one side, said second cam comprises a serrated portion at one side for acting against the serrated portion of said first cam.

4. The gyration/reciprocating action switching mechanism of claim 1 wherein said axle bearing of said second clutch is comprised of two races mounted around said output shaft, and a set of spherical rolling elements mounted around said output shaft between said races.

5. The gyration/reciprocating action switching mechanism of claim 1 wherein said torsional force adjustment mechanism is comprised of a driving member, a driven member, and a spring member, said driving member and said driven member having a respective toothed face portion meshed with each other.

* * * * *

UNITED STATES PATENT AND TRADEMARK OFFICE
CERTIFICATE OF CORRECTION

PATENT NO. : 6,227,085 B1
DATED : May 8, 2001
INVENTOR(S) : Andrew R. Vasquez, Jr.

It is certified that error appears in the above-identified patent and that said Letters Patent is hereby corrected as shown below:

Replace the published abstract with the following corrected version.

(57) ABSTRACT

An improved vibration attenuator for reducing undesired vibrations generated by cutter bits being drawn across the faces of a rotating brake rotor. The attenuator has friction pads with engagement members that extend therefrom which are configured to cause force to exerted on the cutter bits in a direction parallel to the surface being machined and perpendicular to the direction of rotation of the rotor.

Delete columns 1-4, replace with columns 1-4 on attached pages.

Signed and Sealed this

Twenty-eighth Day of August, 2001

*Attest:*

*Attesting Officer*

NICHOLAS P. GODICI
*Acting Director of the United States Patent and Trademark Office*

VIBRATION ATTENUATOR

BACKGROUND OF THE INVENTION

The present invention relates to a vibration attenuator for attenuating the vibration caused during the machining or resurfacing of a disc brake rotor by a pair of cutter bits.

After a period of use the faces of disc brake rotors of automobiles, trucks and the like become worn unevenly. A characteristic pattern of circumferentially arranged ridges and valleys develops which interferes with optimum braking action. Additionally the rotors may become warped which could also have an adverse effect on the vehicle's braking capability as well as the undesirable effect of transmitting a pulsing to the brake pedal. The grooves and/or warpage must be removed by resurfacing or machining the face of the rotor. Typically, this is done by mounting the rotor on an arbor assembly for rotation by a brake rotor lathe. A pair of cutter bits are moved by the lathe carriage across the faces of the rotating rotor to cut enough of the material away to render the faces flat or planar. During this operation the cutter bits and rotor typically produce loud, screeching noises which are not only unpleasant for the lathe operator and others in the vicinity, but the accompanying vibrations of the rotor and bits can adversely affect the accuracy of the machining. The vibration may also have an adverse effect on the bits causing them to over heat and wear prematurely.

Various means have been advanced to attenuate or eliminate such vibrations. One system employs damping pads designed to bear against the opposite faces of the rotor in a position out of the way of the cutter bits. The pads are carried by a relatively complex mounting structure which is secured to the brake lathe. Precise adjustment of the position of the pads is required, and an elaborate linkage arrangement is provided to accomplish this. The arrangement is relatively complex and costly, requires subtle adjustments, and is only partially effective in damping the machining noises.

Another system of the prior art utilizes a resilient band adapted to be stretched and placed about the circumference of the rotor. One must purchase a set of such bands to accommodate each of the various sizes of rotor to be machined. The system is unsatisfactory for that reason, and also because the vibration attenuation is not always adequate.

Yet another arrangement of the prior art employs a U-shape rod or handle which mounts a pair of friction resistant pads at its extremities. The pads are placed in position to bear against the opposite faces of the rotor to thereby damp rotor vibration. However, the pads are not effective to attenuate cutter bit vibrations.

U.S. Pat. No. 4,531,434 describes a device wherein two friction pads are biased against the rotor surfaces while the rotation of the rotors then forces the pads against the cutter arms and bits. Pins projecting from the pads engage the cutter arms to automatically maintain the pads in radial position relative to the arms or bits as they are gradually drawn across the faces of the rotor. However, its use in many lathe configurations is compromised in that the cutter bits must be extended an inordinate distance from the cutter arms in order to provide direct access to the bits by the pads. Although the resulting direct contact of the bit enhances the attenuating effect, the extension of the bit substantially offsets such effect as significantly greater vibration is being generated. Additionally, the handle of the device described in the patent interferes with the lathe carriage of many lathe systems which forces the pads to be angled relative to the bits and therefore further diminishes their efficacy. Further, in certain brake rotor lathe configurations, the cutter bit is attached to the cutter arm by a fastener that interferes with the direct contact of the bits by the attenuator pads as the pads are driven towards the bits by the rotation of the rotor. While such attenuator mechanism is fairly effective in attenuating the vibration, further improvement is desirable.

SUMMARY OF THE INVENTION

The vibration dampener of the present invention improves over previously known devices in that it is configured in such a manner so as to cause the force exerted on a brake rotor lathe's cutter bits to be oriented in a direction substantially perpendicular to the direction of rotation of the workpiece. The device functions in cooperation with a brake rotor lathe that has its cutter bits held in place on their respective cutter arms by a fastener with a raised head. By engaging the side of such raised head, force exerted by the attenuator is transferred to the bit in the appropriate direction.

An attenuator constructed in accordance with the present invention generally includes two friction pads fitted to two arms that are arranged in an opposed relationship wherein a spring extending between the arms biases the arms and hence the two pads towards one another so as to grasp a workpiece being rotated therebetween. The two arms are joined at their proximal ends to define a handle. More particularly, each of the friction pads includes a protruding engagement nub that is configured for contacting the side of raised head of a fastener serving to affix the cutter bit to the cutter arm. The handle is configured to enable the engagement nub to engage the side of the fastener at the appropriate angle.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

Figure 3:
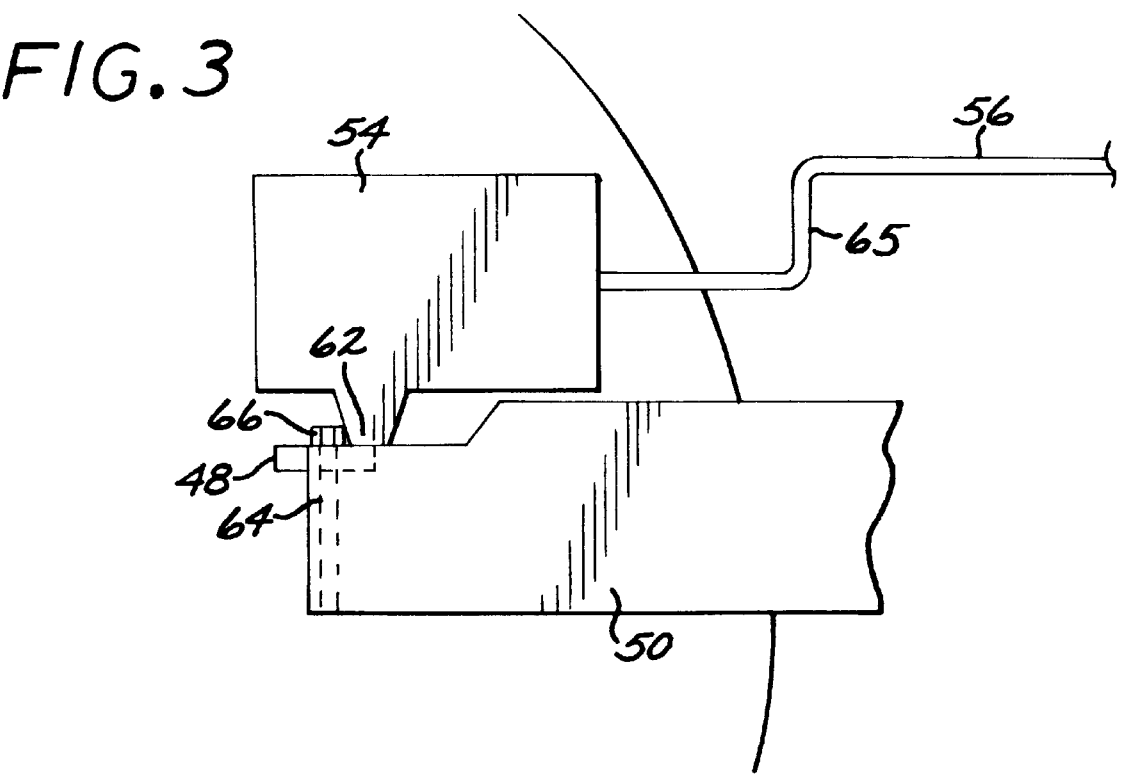
FIG. 3 is a sectional view of the present invention showing the serrated portion of the first cam disengaged from the serrated portion of the second cam.

FIG. 1 is a perspective view of the attenuator device in position on a brake rotor lathe;

FIG. 2 is an enlarged perspective view of the device of the present invention;

FIG. 3 is an enlarged side view of the attenuator in position on the lathe; and

Figure 4:
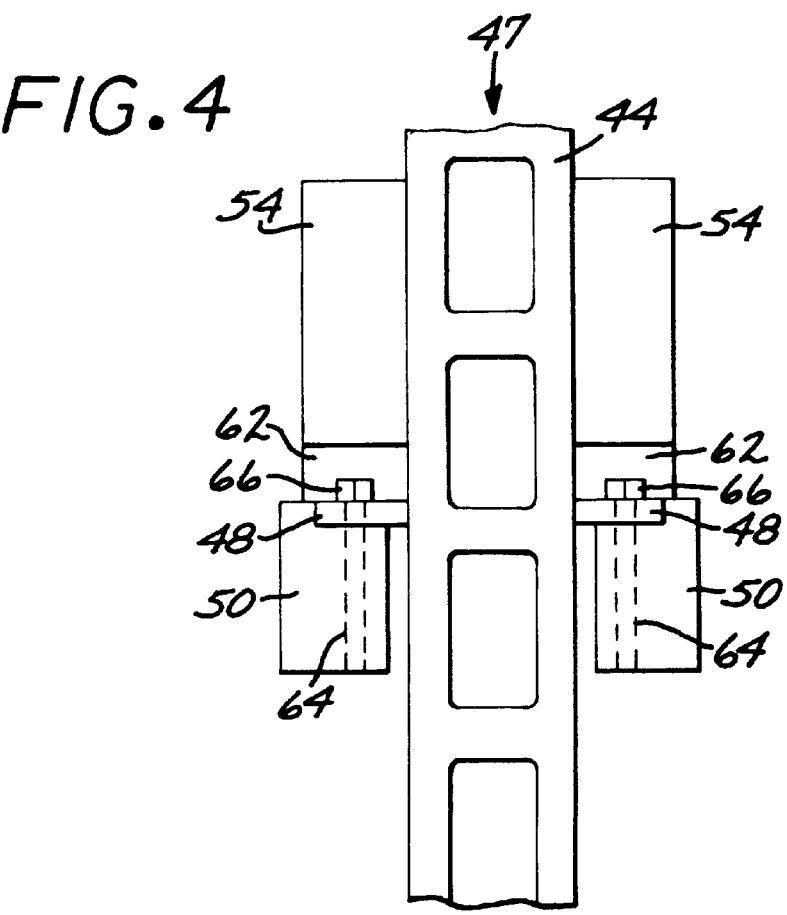
FIG. 4 is similar to FIG. 3 but showing the serrated portion of the first cam meshed with the serrated portion of the second cam.

FIG. 4 is an enlarged cross-sectional view taken along lines IV—IV of FIG. 1.

DETAILED DESCRIPTION OF THE PREFERRED EMBODIMENTS

The attenuator device of the present invention is pinched on to a brake rotor during its resurfacing to reduce the noise that would otherwise be generated, to enhance the effectiveness of the machining operation and to extend the service life of the cutter bits.

FIG. 1 generally shows the device 42 of the present invention in position on a brake rotor 44 during a machining operation. The brake rotor is being rotated by the lathe arbor 46 in direction 47 and cutter bits 48 affixed to ends of cutter arms 50 are gradually drawn across the face of the rotor by the lathe's carriage 52 in a radially outward direction. The two cutter bits are held against the two faces of the rotor such that both faces of the rotor are simultaneously machined in a single machining operation.

FIG. 2 illustrates the attenuator 42 of the present invention. The device consists of a pair of friction pads 54 attached to a pair of arms 56 that are joined at their proximal ends to define a handle 58. A tension spring 60 biases the arms and pads towards one another. Extending from the bottom of the pads are engagement nubs 62.

FIG. 3 illustrates the interaction of the attenuator with the lathe components. The cutter bit 48 is attached to the cutter arm 50 by a fastener 64 that extends through the bit and is threaded into the arm. The fastener has a raised head 66 such as for example an Allen head. The pad is shaped so as to allow the engagement nub 62 to fully engage the side of the raised fastener so that force is applied in a direction perpendicular to the direction of rotation of the workpiece 44 and perpendicular to the longitudinal axis of the fastener. The attenuator arms 56 are shaped to similarly allow the engagement nub to properly contact the fastener head. Such shaping may take the form of an offset 65 in the handle to allow the proximal end of the handle to clear any lathe components that would otherwise cause the undesirable angling of the pads 54 and hence the engagement nubs 62.

FIG. 4 is cross-sectional view taken through the rotor 44 and radially outwardly to illustrate the relationship of the pads 54, and more specifically, the engagement nubs 62 with respect to the head 66 of fastener 64. While the rotation of the rotor in direction 47 causes the pads to be driven against arms 50, the gradual movement of the lathe carriage 52 in a radially outward direction causes the fastener heads 66 to be driven against the engagement nubs 62. Resistance by the pads being urged against the rotor generates the resistive force that serves to attenuate the undesired vibration.

The pads 54 are each initially about ⅜" each thick and are formed of brake lining material. The engagement nubs are an integral part of the pad extend downwardly approximately ⅜". The arms 56 and handle 58 are formed of stainless steel wire and extend about 7½" from the pads. The offset 65 in the handle is about ⅜". An attenuator of the present invention with such dimensions is ideally suited for use with a brake rotor lathe sold under the trademark PRO-CUT.

The attenuator device 42 of the present invention is fabricated by cutting brake lining material to size to form the pads 54 with integral engagement nubs 62. Slightly undersized holes are then drilled in the edges to receive the arms 56. The components are forced together and are held in place by the resulting friction fit. The handle is then dipped in a rubber or other suitable resilient plastic material that provides an non-slip surface. The spring 60 is clipped into place to complete the assembly process.

In use, the attenuator device of the present invention is pinched onto the rotor being turned by the lathe. The friction generated by the pads 54 being forced against the rotor 44 surfaces by spring 60 causes the device to be forced in the direction of rotation (47) until the engagement nubs 62 make contact with the cutter arms 50. The shape of the pads 54 and the shape of the handle 58 allows the side of the engagement nub to make full contact with the side of the raised head 66 of fastener 64 that serves to attach the cutter bit 48 to cutter arm 50. As the lathe carriage 52 is gradually drawn radially outwardly, the raised fastener heads are driven against the engagement nubs wherein resistance of the pads against the rotor creates a resistive force oriented perpendicular to the direction of rotation of the workpiece. Such force is transferred to the cutter bit and serves to attenuate the undesired vibrations.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A vibration attenuator for attenuating vibrations generated during the resurfacing of a brake rotor by a brake rotor lathe, wherein two cutter bits, each supported by a cutter arm, are gradually drawn across the brake rotor surfaces as such rotor is being rotated and wherein each of said cutter bits is affixed to the cutter arm by a fastener having a raised head with a surface facing the direction in which said cutter bit is drawn across the brake rotor surface, comprising:

a pair of friction pads each having an engagement nub protruding therefrom and extending across the entire thickness of said pad, configured for engaging said surface of one of said raised heads; and a spring means for biasing said pads against said rotor, whereby said raised head is driven into said engagement nub as said cutter arms are drawn across said brake rotor which is resisted by friction generated by said pads biased against said rotor by said spring means.

2. The vibration attenuator of claim 1, wherein each of said pads is shaped so as to enable said nub to engage said surface of said fastener head in its entirety.

3. The vibration attenuator of claim 1, further comprising arms extending from said pads to which said spring means is attached, wherein said arms are shaped to enable each of said nubs to engage said surface of one of said fastener heads in its entirety.

4. The vibration attenuator of claim 1, wherein each of said nubs is an integral part of the respective pad.

5. The vibration attenuator of claim 4, wherein said pad and nub are formed of a single piece of brake lining material.

* * * * *